United States Patent [19]

Samuelsson

[11] Patent Number: 4,604,802
[45] Date of Patent: Aug. 12, 1986

[54] SQUEEGEE BLADE TRIMMER

[76] Inventor: Soren Samuelsson, 74-259 Candlewood St., Palm Desert, Calif. 92260

[21] Appl. No.: 663,395

[22] Filed: Oct. 22, 1984

[51] Int. Cl.[4] .............................................. B25F 3/00
[52] U.S. Cl. ........................................ 30/124; 30/314; 30/337; 30/338; 83/743; 269/157; 269/188
[58] Field of Search ................... 30/2, 92.5, 124, 278, 30/296 R, 314, DIG. 3, 334, 337, 338; 83/743, 648; 269/139, 157, 162, 188, 196, 217

[56] References Cited

U.S. PATENT DOCUMENTS

| | | |
|---|---|---|
| 528,968 | 11/1894 | Peabody ............................. 269/157 |
| 763,941 | 6/1904 | Butcher . |
| 1,042,232 | 10/1912 | Job . |
| 1,715,722 | 6/1929 | Smith et al. . |
| 2,407,990 | 9/1946 | Lurie ..................................... 81/118 |
| 2,520,000 | 8/1950 | Dettman ............................. 146/72 |
| 2,721,384 | 10/1955 | Bell ....................................... 30/91 |
| 2,881,520 | 4/1959 | Mito ..................................... 30/280 |
| 3,068,569 | 12/1962 | Campbell, Jr. ...................... 30/294 |
| 3,327,588 | 6/1967 | Yandell ................................. 90/24 |
| 3,337,955 | 8/1967 | Poletajev ............................ 30/294 |
| 3,803,713 | 4/1974 | Jones et al. ............................... 30/2 |
| 3,831,279 | 8/1974 | Burns ................................... 30/278 |

FOREIGN PATENT DOCUMENTS 447409  5/1936  United Kingdom ..................... 30/2

Primary Examiner—E. R. Kazenske
Assistant Examiner—Willmon Fridie, Jr.
Attorney, Agent, or Firm—Fulwider, Patton, Rieber, Lee & Utecht

[57] ABSTRACT

The squeegee blade trimmer of the present invention includes a pair of back to back C-channels having mounted along one side thereof a pair of shear bars, along with a pair of parallel extending tracks. The C-channels are hinged together on their opposite side and a press clamp mechanism is provided for selectively drawing the channels together. A blade holder is provided with a pair of runners for running along the tracks such that a worn, flexible squeegee blade may be placed between the shear bars and the blade holder run along the tracks causing a laterally extending blade edge to sever a worn edge of the squeegee blade from the body of the squeegee thus leaving a fresh, clean straight edge.

8 Claims, 5 Drawing Figures

U.S. Patent    Aug. 12, 1986    4,604,802
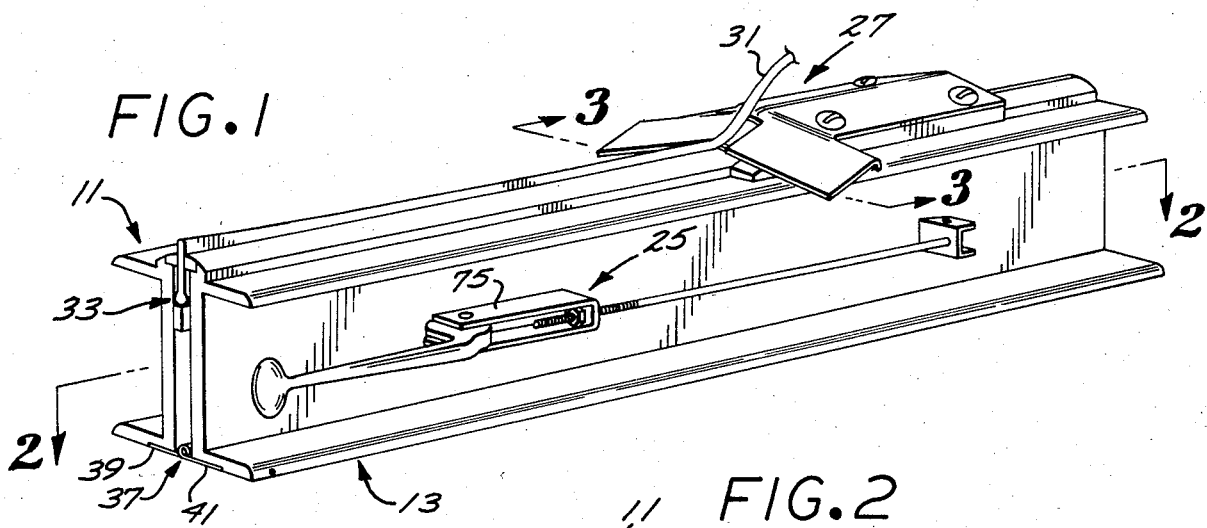
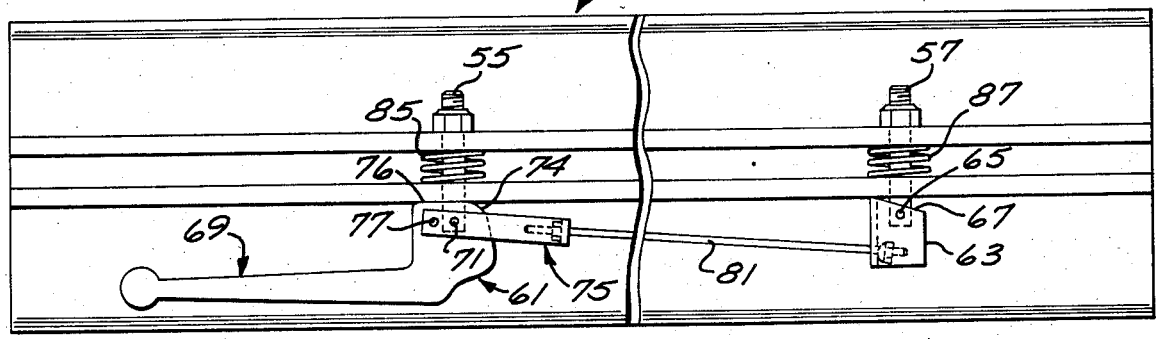
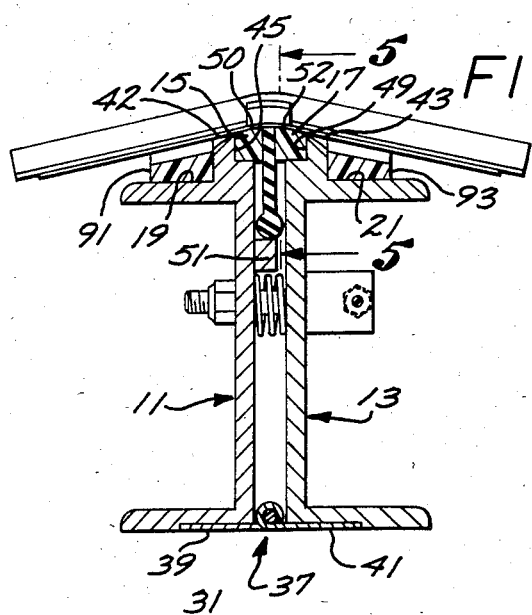
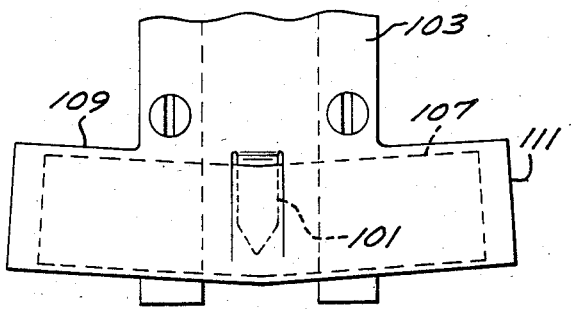
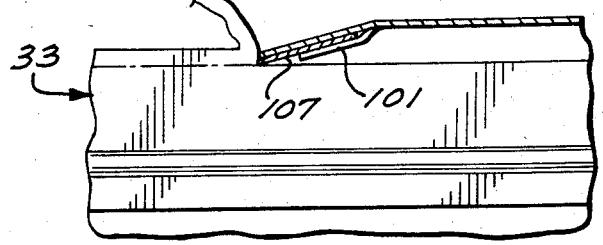

4,604,802

SQUEEGEE BLADE TRIMMER

BACKGROUND OF THE INVENTION

1. Field of the Invention

The present invention relates to a trimmer for trimming the worn edge from a squeegee blade.

2. Description of the Prior Art

In the washing of windows it is common practice to wet the windows, as with a spray hose, and to then run a squeegee blade across the surface of the window pane to squeegee the water and any dirt or residue therefrom. Particularly in the cleaning of the large windows of commercial buildings, a squeegee blade frequently becomes worn leaving it with an uneven or ill defined wiping edge. Typically the body of the squeegee blade remains in good repair, except for the worn working edge. However, trimming of the working edge by known methods is prohibitively inconvient and expensive thus resulting in the squeegee blade with a worn edge being discarded and replaced with a new squeegee blade. This practice is relatively expensive and is wasteful of material and supplies. Consequently, there exists a need for a mechanism for conveniently trimming the edge of a squeegee blade in a straight, sharp, clean line thus forming a new working edge which may give additional service.

Various devices have been proposed for trimming paper and the like. Such devices are shown in U.S. Pat. Nos. 2,881,520; 3,068,569 and 3,337,955. However, such devices are inherently unacceptable for trimming a flexible squeegee blade to leave a renewed working edge.

SUMMARY OF THE INVENTION

The squeegee blade trimmer of the present invention is characterized by a pair of co-extensive beam members having mounted on one side thereof confronting shear bars, backed by a pair of elongated tracks. A press clamp is provided for selectively drawing the members together with a squeegee blade received between the shear bars to hold it firmly with the worn edge thereof exposed beyond such bars. A blade holder may then advanced along the track to cause a laterally extending blade to sever the squeegee blade along a straight well defined line thus removing the worn edge and leaving a new straight working edge.

Other objects and features of the invention will become apparent from consideration of the following description taken in connection with the accompanying drawings.

DESCRIPTION OF DRAWING

FIG. 1 is a perspective view of a squeegee blade trimmer embodying the present invention;

FIG. 2 is a longitudinal broken sectional view, in enlarged scale, taken along the line 2—2 of FIG. 1;

FIG. 3 is a transverse sectional view, in enlarged scale, taken along the line 3—3 of FIG. 1;

FIG. 4 is a partial top plan view, in enlarged scale, of the timer shown in FIG. 1 and particularly depicting a blade holder; and FIG. 5 is a longitudinal sectional view, in enlarged scale, taken through the blade holder shown in FIG. 1 and depicting the blade during the cutting process.

DESCRIPTION OF THE PREFERRED EMBODIMENT

The squeegee blade trimmer of the present invention is characterized by a pair of co-extensive back to back C-channels forming beams 11 and 13 which are hinged together along their bottom sides as shown in FIG. 1. Referring to FIG. 3, mounted on the top of the C-channels 11 and 13 is a pair of elevated shear bars 15 and 17, such shear bars having formed along the opposite sides thereof a pair of co-extensive upwardly facing flat surfaces which form respective tracks 19 and 21. A clamp apparatus, generally designated 5 (FIG. 1) is provided for selectively drawing the C-channels together. A blade holder, generally designated 27, is provided for sliding along the tracks 19 and 21 to sever a worn edge strip 31 from a squeegee blade, generally designated 33, held firmly between the bars 15 and 17.

The C-channels 11 and 13 may be constructed of any desirable material, such as hard plastic or extruded aluminum. Such C-channels act as beams and are connected together along their bottom sides by means of a piano hinge 37 which extends the full length of such beams 11 and 13 and has its opposite flanges 39 and 41 secured to the bottom side of the bottom flanges of such beams 11 and 13.

The C-channel beams 11 and 13 are formed with top flanges which have flat upper surfaces that define the tracks 19 and 21 (FIG. 3). Rising upwardly from the top flanges and extending above the tracks 19 and 21 are respective fittings which form respective back walls 42 and 43 having formed therebetween, as viewed in FIG. 3, respective elongated recesses 45 and 49 for receipt of the respective shear beams 15 and 17. The shear beams 15 and 17 are generally square in cross-section for fitting in the recesses 45 and 49 but are formed on their top sides with laterally outwardly and downwardly rounded surfaces 50 and 52 (FIG. 3).

Still referring to FIG. 3, mounted on the inside of the vertical flange of the beam 11 is a longitudinally extending stop 51 against which the bottom end of the squeegee 33 may abut.

Referring to FIGS. 1 and 3, the press device 25 includes a pair of lateral connector bolts 55 and 57 which project freely through a pair of bores formed in the vertical flange of the beam 11 and have mounted on their respective one ends a toggle clamp 61 and a trapezoidal shaped clamp element 63 (pivotally). The clamp element 63 is in the form of a channel as viewed in FIG. 1 having a pivot pin 65 extending therethrough to connect it with the end of the connector bolt 57. The laterally interior end of the clamp channel 63 is cut on a taper at 67 to facilitate clamping thereof against the vertical wall if the I-beam 13.

The toggle clamp 61 includes a handle 69 pivotally connected to the end of the bolt 55 by means of a pivot pin 71 as shown in FIG. 2. The base of the handle 67 is formed with an arcuate cam surface 74 having a flat side 76 which sets against the face of the vertical walls of the beam 13 when the handle is in its locking position. Also connected with the base of the handle 69 is a clevis 75 (FIG. 1) which has a pivot pin 77 (FIG. 2) making the connection at a point spaced beyond the pivot pin 71 from the clamp channel 63 as viewed in FIG. 2. The clevis 75 is connected to the clamp channel 63 by means of a tie rod 81 as seen in FIG. 2. The configuration of the handle 69, pivot 71 and 77 and handle cam surface 74 is such that when the clamp handle 69 is rotated clockwise from a position projecting laterally of the longitudinal direction of the beams toward the position shown in FIG. 2, the pivot pin 77 moves over center thus causing the handle to be locked in position in a manner similar to that of a toggle clamp.

With continued reference to FIG. 2, a pair of coil compression springs 85 and 87 are telescoped over the connector rods 55 and 57 and are interposed between the vertical flanges of the beams 11 and 13 to urge such beams apart.

Referring to FIGS. 1 and 4, the blade holder 27 includes a cover 103 which is somewhat T-shaped as viewed in plan view and is mounted on a pair of runners 91 and 93 for running on the tracks 19 and 21 (FIG. 3). The cover is formed with a pair of outwardly and downwardly angled wings 109 and 111. A central support prong 101 (FIG. 4) is struck out of a cover 103 mounted on the rails 91 and 93 to extend beneath the center of the body of a flexible razor blade 107 held at its opposite extremities under the wings 109 and 111.

In operation when a squeegee 33 becomes worn such that the working edge thereof is no longer even or has assumed a rounded and ineffective profile, the blade itself may be removed from the squeegee handle and the worn edge thereof trimmed in the holder of the present invention. To achieve this trimming the handle 69 is rotated counterclockwise as viewed in FIG. 2 thereby swinging the handle about its rounded cam surface 74 and bringing the pivot pin 77 over center about the pivot pin 71 thereby driving the link 81 to the right and upsetting the clamp channel 63 permitting the sloped surface 74 to set flush down against the exterior surface of the vertical wall of the channel beam 13. Thus, the upper side of the beams 11 and 13 are freed to pivot apart a limited distance under the influence of the coil springs 85 and 87 and about the pivot pin of the hinge 37 thus spreading the shear bars 15 and 17 apart.

With the shear bars 15 and 17 so spread apart the squeegee 33 may be received therebetween with the worn edge thereof extended above the top surfaces of such bars to expose such edge for trimming. The clamp handle 69 is then rotated clockwise to right the clamp channel 63 and rotate such handle 69 about its cam surface 74 thus pivoting the pivot pin 77 over center to thereby press the to cause such handle and the clamp channel 63 to cooperate in pressing the vertical webs of the C-beams 11 and 13 together thereby firmly gripping the squeegee blade 33 between the shear bars 15 and 17.

With the squeegee blade 33 firmly held between such shear bars 15 and 17, the blade holder 27 may be brought into position with the runners 91 and 93 positioned on the tracks 19 and 21 to permit such holder to be drawn along such tracks thereby causing the laterally extending cuttin edge of the blade 107 to sever the worn strip 31 from the body of the squeegee blade 33 thus leaving a straight, clean well defined squeegee blade edge. After the blade holder 27 has been drawn along the entire length of the C-beams 11 and 13 thus severing the full length of the squeege blade 33, the toggle clamp handle 69 may be rotated again in a counterclockwise direction thus releasing the pressure on the connector bolts 55 and 57 thereby freeing the top extremities of the beams 11 and 13 to be urged apart by means of the compression springs 85 and 87 to thus free the squeegee blade 33 for removal and reinstallation in the squeegee blade handle.

It will be appreciated that whenever the blade 107 becomes dulled, the screws holding the top 103 in position may be loosened to free the blade for removal and sharpening or replacement with a new razor blade.

From the foregoing it will be apparent that the squeegee blade trimmer of the present invention provides an economical and convenient means for salvaging a worn squeegee blade and extending the service life thereof by merely trimming and retrimming the blade for repetitive use.

Various modifications and changes may be made with regard to the foregoing detailed description without departing from the spirit of the invention.

I claim:

1. A squeegee blade trimmer comprising:
    a squeegee blade holder having top and bottom sides and including a pair of elongated, parallel beam members spaced apart for receipt therebetween of a squeegee blade to be trimmed;
    a pair of parallel shear bars, one mounted on each of said beam members for pressing against the opposite sides of said blade;
    a pair of parallel tracks, one mounted on the top side of each beam member;
    releasable press means coupled between said beam members for selectively drawing said beam members together; and
    a cutting blade holder formed with a pair of runners for riding on said tracks and including clamp means, said trimmer including a cutting blade for receipt in said clamp means and adapted to be clamped therein with its cutting edge extending laterally of the longitudinal direction or said shear bars wnen said runners of said cutting blade holder are sitting in position on said tracks whereby said press means may be released to enable a worn squeegee blade to be positioned between said shear bars with the worn edge projecting therefrom, said press means activated to draw said beam members together to press said squeegee blade between said shear bars, said cutting blade holder positioned on said squeegee blade holder with said runners riding on said tracks and drawn along said tracks to draw said cutting edge through the body of said squeegee blade to sever said worn edge therefrom.

2. A squeegee blade trimmer according to claim 1 wherein:
    said press means includes at least one toggle clamp.

3. A squeegee blade trimmer according to claim 1 wherein:
    said beam members are in the form of C-channels.

4. A squeegee blade trimmer according to claim 1 wherein:
    said squeegee blade holder includes a hinge connecting said beams together on the bottom side thereof.

5. A squeegee blade trimmer according to claim 1 wherein:
    said cutting blade clamp is adapted for receiving and clamping a conventional flexible razor blade.

6. A squeegee blade trimmer according to claim 1 wherein:
    said cutting blade clamp is adapted for receipt of a flexible cutting blade and is formed with a top having support wings projecting laterally outwardly and downwardly in opposite directions from the center of said squeegee blade holder for receipt thereunder of said cutting blade to cause said wings to engage the opposite extremities of said cutting blade to cause said blade to assume a chevron.

7. A squeegee blade trimmer according to claim 1 that includes:
   spring means interposed between said beam members and urging them apart.

8. A squeegee blade trimmer according to claim 7 wherein:
   said press means includes a pair of first and second connectors spaced along the length of said beam members and connecting said beam members together, a first clamp element on said first connector and operative in response to being drawn toward said second connector to draw the respective one ends of said beam members together and a toggle clamp on said second connector, said toggle clamp including a pivotal handle operative in response to being rotated away from said first connector to draw the end of said beam members opposite said one end together, said press means further including a link connecting said first clamp element to said toggle clamp handle and operative in response to said handle being pivoted to its clamped position to pivot said first clamp element to its clamped position.

* * * * *